May 10, 1932.     M. CHOUINARD ET AL     1,857,940
VALVE COCK
Filed Dec. 5, 1930
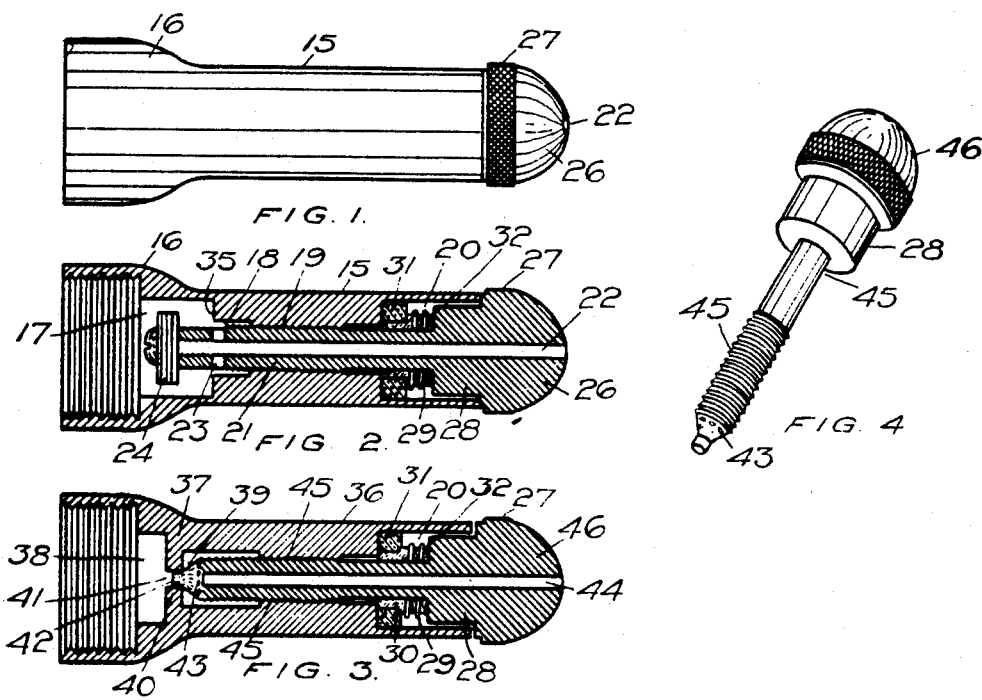

Patented May 10, 1932

1,857,940

UNITED STATES PATENT OFFICE

MICHEL CHOUINARD, OF MONTREAL, QUEBEC, AND JOSEPH PHILIPPE PARADIS, OF LONGUEUIL, QUEBEC, CANADA

VALVE COCK

Application filed December 5, 1930. Serial No. 500,256.

The invention relates to valve cocks, as described in the present specification and illustrated in the accompanying drawings that form part of the same.

The invention consists essentially in the novel association of the valve and stem in direct operative relation to the casing as pointed out in the claims for novelty following a description in detail of the preferred forms of the invention.

The objects of the invention are to reduce the number of parts in such devices and thereby effect great economy in the cost of production and at the same time insure efficiency and simplicity in the operation of hose nozzles, faucets and other articles of the kind; to facilitate the manufacture of tightly fitting valves and eliminate the use of rubbing washers, thus doing away with the necessity of constant replacements; to minimize the cost of maintenance in regard to large and small hose nozzles and also in respect to faucets by constructing the operating parts practically free from rubbing surfaces; and generally to provide in a valve cock for hose nozzles and other purposes a simple and effective mechanism of a durable construction at a low first cost.

In the drawings, Figure 1 is a side elevational view of a hose nozzle containing this invention.

Figure 2 is a longitudinal sectional view of a hose nozzle, containing this invention.

Figure 3 is a longitudinal sectional view showing a slight modification of the invention.

Figure 4 is a perspective detail of the valve and stem illustrated in Figure 3.

Like numerals of reference indicate corresponding parts in the various figures.

Referring to the drawings, and particularly to Figures 1 to 4, the casing or barrel indicated by the numeral 15 is formed with the enlarged joint end 16 internally threaded, which is extended outwardly and forms the water inlet chamber 17, the reduced water inlet chamber 18 the threaded bore 19 and gland box 20.

The valve stem 21 having the longitudinal passage 22 is pierced adjacent to the valve end to form the inlet ports 23 communicating with said passage 22 and carries the valve 24 at one end of the stem, this valve being held by the screw 25.

The other end of the stem terminates in the discharge or nozzle head 26 through which the passage 22 extends, this discharge or nozzle head having the knurled ring surface 27 adjacent to the reduced cylindrical body 28 rotatably mounted in the outer end portion of the barrel 15 and constituting with the spring 29, the packing 30 and the washer 31, a gland and packing contained in the gland box 20, the said spring, the said washer and the said packing engaging the shoulder 32 formed by the cylindrical portion 28 of the head and encircling the stem proper between said shoulder 32 and the shoulder 33 within the casing.

It will thus be seen that the packing absolutely prevents the flow of water between the casing and the stem as the stem 21 is threaded at 34 and turns in the thread 19 of the casing, and while there is little danger of the water leaking through this thread, the packing insures the stoppage of any such leakage.

The shoulder or seat 35 is formed by the reduction of the inner bore of the barrel to form the extension inlet chamber 18, thus the valve 24 is seated and this valve is operated by rotating the nozzle 26 through the knurled ring which opens or closes the main inlet to this barrel and consequently controls the flow of water through the ports 23.

In Figure 3 the screw movement is reversed and the casing 36 or barrel is formed in the interior with the partition 37 between the main inlet chamber 38 and the extension inlet chamber 39, this partition having the seat 40 encircling the main inlet port 41 and seating the cone valve 42, this cone valve being formed with the ports 43 communicating with the central passage 44 through the valve stem 45 corresponding to the valve stem 21 with the exception of the cone valve 42 terminating the inner end.

In this form of the invention the head 46 is moved away from the seat 40 by unscrewing the stem until the main inlet port 41 permits the flow of water through the ports 43 and on to the discharge from the nozzle head 46.

The operation of this invention is accomplished by unscrewing the head carrying the valve stem and screwing it up again and this moves the valve and opens or closes the outlet port, as the case may be.

What we claim is:—

1. In a hose nozzle, a barrel forming a handle and having a threaded bore and a tubular valve stem threaded in said bore and carrying a valve at its inner end and an integral nozzle head at its outer end having a cylindrical portion fitting in said barrel and acting as an operating knob in seating and unseating said valve.

2. In a hose nozzle, a barrel forming a handle and having a bore intermediately situated and connecting enlarged end bores, a hollow stem carrying a valve at one end and an integral pierced head at the other end capping the end of said barrel and reciprocating in seating and unseating said valve and a packing gland and packing compressible in said barrel during the movements of said stem and head.

3. A hose nozzle comprising a casing having a recessed outer end and a central threaded passage extending from said recess to an inlet chamber, a nozzle head and threaded stem extension therefrom and a valve at the inner end of the stem, and spring held packing in said recessed outer end constantly compressed during the reciprocating movements of said head.

4. A hose nozzle comprising a casing forming a portable handle and having a recessed outer end and a rotatable pierced head having a knurled ring surface and a reduced inner end fitting in the recessed outer end of said casing and continuing in a still further reduced pierced stem portion having an external thread and terminating in a valve operated to and from its seat by the rotation of said head and the engagement of said external thread with a thread intermediately situated in the casing and packing behind said head.

5. A hose nozzle comprising a barrel forming a hand grip and threaded exteriorly in its intermediate portion, a rotatable pierced nozzle head with a stepped down pierced extension, the latter forming a threaded valve stem carrying a valve at the inner end and screwed into said threaded portion and extending therebeyond, and packing behind said head and compressed by said head.

Signed at Montreal, Canada, this 3rd day of November, 1930.

MICHEL CHOUINARD.
JOSEPH PHILIPPE PARADIS.